(12) United States Patent
Schillinger et al.

(10) Patent No.: US 12,392,378 B2
(45) Date of Patent: Aug. 19, 2025

(54) ASSEMBLY FOR CONNECTING AN ADAPTER SHAFT TO A SHAFT IN A FORCE-FITTING MANNER USING A CLAMPING RING

(71) Applicant: SEW-EURODRIVE GMBH & CO. KG, Bruchsal (DE)

(72) Inventors: Jens Schillinger, Rastatt (DE); Sascha Haller, Karlsruhe (DE); Markus Wöppermann, Karlsbad (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 1105 days.

(21) Appl. No.: 16/645,787

(22) PCT Filed: Aug. 21, 2018

(86) PCT No.: PCT/EP2018/025220
§ 371 (c)(1),
(2) Date: Mar. 9, 2020

(87) PCT Pub. No.: WO2019/048082
PCT Pub. Date: Mar. 14, 2019

(65) Prior Publication Data
US 2020/0271164 A1     Aug. 27, 2020

(30) Foreign Application Priority Data

Sep. 8, 2017 (DE) ...................... 10 2017 008 437.8

(51) Int. Cl.
*F16D 1/08*    (2006.01)
*F16D 1/04*    (2006.01)
(52) U.S. Cl.
CPC ............. *F16D 1/04* (2013.01); *F16D 1/0847* (2013.01)

(58) Field of Classification Search
CPC ........ F16B 7/042; F16B 7/0406; F16B 7/182; F16B 21/10; F16B 21/12; F16B 21/14;
(Continued)

(56) References Cited

U.S. PATENT DOCUMENTS 425,324 A * 4/1890 Howell ...................... F16D 1/04
105/299
2,426,219 A * 8/1947 Jackson .................. F16D 1/096
403/239
(Continued)

FOREIGN PATENT DOCUMENTS

CN    104053919 A    9/2014
CN    105121881 A    12/2015
(Continued)

OTHER PUBLICATIONS

Chinese Office Action issued in corresponding CN Patent Application No. 201880057282.5, dated Apr. 25, 2022, pp. 1-12, together with English-language translation.
(Continued)

*Primary Examiner* — Amber R Anderson
*Assistant Examiner* — Zachary A Hall
(74) *Attorney, Agent, or Firm* — Carter, DeLuca & Farrell LLP

(57) ABSTRACT

In an assembly for connecting an adapter shaft to a shaft in a force-fitting manner using a clamping ring, the clamping ring is mounted on the adapter shaft, the shaft is inserted into the adapter shaft, the clamping ring has a radially continuous threaded bore into which a screw part is screwed, in particular a threaded pin, which exerts pressure on the adapter shaft, at least one insertion ring is inserted in an annular groove introduced into the clamping ring, in particular in an annular groove introduced into the inner wall, i.e. in particular the hollow side of the clamping ring, and/or is at least
(Continued)

partially accommodated therein, and the insertion ring, or each insertion ring, has a nose region that projects radially inward and which projects at least partially into a slot of the adapter shaft.

19 Claims, 12 Drawing Sheets

(58) Field of Classification Search
CPC ...... F16B 21/18; F16B 21/183; F16B 21/186; F16D 1/108; F16D 1/116; F16D 1/14; F16D 1/0829; F16D 1/0847; F16D 1/0852; F16D 1/0864; Y10T 403/589; Y10T 403/7041; Y10T 403/7067
See application file for complete search history.

(56) References Cited

U.S. PATENT DOCUMENTS

| | | | | |
|---|---|---|---|---|
| 3,680,404 A | * | 8/1972 | Firth | ............... F16H 55/566 474/33 |
| 3,762,455 A | * | 10/1973 | Anderson, Jr. | ......... F16B 39/10 411/190 |
| 4,124,318 A | * | 11/1978 | Sagady | .................. F16B 21/18 403/14 |
| 4,603,998 A | * | 8/1986 | Bober | ...................... F16D 1/10 403/322.2 |
| 5,429,446 A | * | 7/1995 | Challis | ................... F16B 4/002 403/31 |
| 9,945,426 B2 | | 4/2018 | Kasper | |
| 10,107,324 B1 | * | 10/2018 | Rode | ...................... F16B 39/10 |
| 2007/0098314 A1 | | 5/2007 | Lenick et al. | |

FOREIGN PATENT DOCUMENTS

| | | | | |
|---|---|---|---|---|
| DE | 4006475 A1 | * | 9/1991 | ............. F16D 1/116 |
| DE | 19844828 A1 | | 7/1999 | |
| DE | 29915021 U1 | | 11/1999 | |
| DE | 102012000537 A1 | | 7/2013 | |
| DE | 102013100129 A1 | | 7/2014 | |
| DE | 102014007063 A1 | | 11/2014 | |
| EP | 0643228 A1 | | 3/1995 | |
| GB | 2277569 A | * | 11/1994 | ............ F16B 5/0208 |
| GB | 132886 A | | 3/2019 | |
| WO | WO-2014187540 A1 | * | 11/2014 | ........... F16D 1/0847 |

OTHER PUBLICATIONS

Notification of Grant Patent Right for Invention issued in corresponding CN Patent Application No. 201880057282.5 dated Sep. 6, 2022, pp. 1-3, together with English-language translation.

* cited by examiner

ASSEMBLY FOR CONNECTING AN ADAPTER SHAFT TO A SHAFT IN A FORCE-FITTING MANNER USING A CLAMPING RING

FIELD OF THE INVENTION

The present invention relates to an assembly for connecting an adapter shaft to a shaft in a force-fitting manner using a clamping ring.

BACKGROUND INFORMATION

A shaft-hub connection is described in German Published Patent Application No. 10 2014 007 063. In this instance, an adapter shaft is connected to a shaft with the aid of a clamping ring mounted on the adapter shaft.

SUMMARY

Example embodiments of the present invention provide a force-fitting connection between a shaft and an adapter shaft.

According to an example embodiment of the present invention, in an assembly for connecting an adapter shaft to a shaft in a force-fitting manner using a clamping ring, the clamping ring is mounted on the adapter shaft, the shaft is inserted into the adapter shaft, the clamping ring has a radially uninterrupted threaded bore into which a screw part is screwed, in particular a threaded pin, which exerts pressure on the adapter shaft, at least one insertion ring is inserted in an annular groove introduced into the clamping ring, in particular in an annular groove introduced into the inner wall, i.e. in particular into the hollow side, of the clamping ring, and/or is at least partially accommodated therein, the insertion ring, or each insertion ring, has a nose region that projects radially inward and projects at least partially into a slot of the adapter shaft.

This offers the advantage that a protection against loss is formed, in particular both in an axial direction and in a circumferential direction. The arrangement hereof may be readily obtained and requires no further special mechanism with the exception of the insertion part.

Because of the axial slots, the adapter shaft is elastically deflectable and thus is able to be pressed against the hollow shaft as soon as the threaded pin exerts pressure on the adapter shaft. The shrink-fitting is brought about in the process. A threaded bore, which passes through the clamping ring, is provided for the threaded pin. The recesses, on the other hand, do not have an uninterrupted configuration, especially not on the adapter shaft and also not on the clamping ring.

In this context, shrink-fitting does not refer to thermally induced contracting but to mechanically induced contracting.

As a result, the arrangement hereof improves the reliability of a force-fitting connection between the shaft and the adapter shaft in that a clamping ring is used for shrink-fitting the adapter shaft provided with a hollow shaft region, the clamping ring being captively positioned on the adapter shaft, in particular captively positioned in the axial direction and in the circumferential direction.

According to example embodiments, the slot is radially continuous, and in particular continues through the wall of the hollow adapter shaft, the slot being an axial slot, which thus extends in the axial direction in relation to the shaft axis of the adapter shaft, or the slot is a transverse slot, which thus extends transversely to the axial direction in relation to the shaft axis of the adapter shaft, i.e. especially in the circumferential direction in relation to the shaft axis of the adapter shaft. This is considered advantageous insofar as the loss protection is easy to produce.

According to example embodiments, the insertion ring, or each insertion ring, is produced as a plastic injection-molding part. This offers the advantage of an easy and cost-effective production.

According to example embodiments, the transverse slot passes through an axial slot. This has the advantage that the nose regions are initially able to be introduced into the axial slot and then into the transverse slots. A simple, rapid connection is able to be established in this manner.

According to example embodiments, the adapter shaft has additional axial slots, which are set apart from one another at regular intervals in the circumferential direction. This is considered advantageous insofar as high elasticity is readily achievable and uneven radially directed upward warping of the adapter shaft in the circumferential direction is possible.

According to example embodiments, the shaft is inserted into a region of the adapter shaft that is arranged as a hollow shaft region, and in particular is situated coaxially with the adapter shaft. This has the advantage that a shrink-fitting connection is readily achievable with the aid of the clamping ring mounted on the adapter shaft.

According to example embodiments, the axial slots are open toward the axial end of the adapter shaft, and thus particularly lead into the environment, especially into the ambient air. This is considered advantageous insofar as high elasticity of the adapter shaft is readily achievable.

According to example embodiments, the insertion ring has a radially inward projecting web region that is set apart from its nose region in the circumferential direction, the web region at least partially projecting into the transverse slot. This is considered advantageous insofar as it makes it possible to obtain an uncomplicated axial protection.

According to example embodiments, the adapter shaft has a chamfer in its axial end region, in particular a lead-in bevel. This is considered advantageous insofar as it allows for an uncomplicated mounting of the clamping ring.

According to example embodiments, the web region projects radially inward and the radially inward edge is aligned tangentially. This has the advantage that an axial securing is achievable by the projection into the transverse slot.

According to example embodiments, the clamping ring has a lead-in bevel in its axial end region. This has the advantage that the production is uncomplicated and does not require great force.

According to example embodiments, the adapter shaft has axial slots, in particular axial slots that are set apart from one another in the circumferential direction, in particular axial slots that are set apart from one another at regular intervals in the circumferential direction. This is considered advantageous insofar as the adapter shaft is deformable without applying much force and the deformation does not permit waves to form in the circumferential direction. This is so because without axial slots, there would be a risk that the adapter shaft does not form any circumferential radially directed, sinusoidal-type characteristics in the circumferential direction when the threaded pin is pressed against the adapter shaft, but the adapter shaft rests against the solid shaft as uniformly as possible.

According to example embodiments, the shaft is inserted into a region of the adapter shaft that is arranged as a hollow shaft region, and in particular is situated coaxially with the adapter shaft. This has the advantage that the shaft is able to be accommodated in the adapter shaft and in the process is centered with respect to the axis of rotation of the adapter shaft.

According to example embodiments, the axial slot or the axial slots at the axial end of the adapter shaft lead(s) into the ambient air. This has the advantage that the adapter shaft has great elasticity in the axial end region.

According to example embodiments, the adapter shaft has an increasing radial distance in the direction of the axial end, in particular has a radially protruding bead that extends in the circumferential direction, so that an engagement of the clamping ring from behind is provided, the adapter shaft thus particularly engaging with the clamping ring from behind. This has the advantage that the clamping ring is able to be snapped onto the adapter shaft because the bead, which is elastically deflected in the radially inward direction, clicks into place behind the clamping ring and thereby secures the clamping ring on the adapter shaft.

In particular, a shaft collar is provided on the adapter shaft on the side axially facing away from the bead, which axially restricts the clamping ring, in particular in the mounting direction. This is considered advantageous insofar as it enables an uncomplicated axial restriction.

Further features and aspects of example embodiments of the present invention are described in more detail below with reference to the appended Figures.

BRIEF DESCRIPTION OF THE DRAWINGS

FIG. 1 is a longitudinal cross-sectional view through a clamping unit, i.e. a clamping assembly, which has an adapter shaft 1 with a mounted clamping ring 4 and insertion ring 3 provided to prevent loss of clamping ring 4.

FIG. 2 is a perspective view of adapter shaft 1 from a first viewing direction.

FIG. 3 is a perspective view of adapter shaft 1 from a different viewing direction.

FIG. 4 is a perspective view of adapter shaft 1 from yet another viewing direction.

FIG. 5 is an exploded view of the clamping unit, adapter shaft 1 and clamping ring 4 being shown in a part-sectional view, and insertion ring 3 being shown in a non-sectioned view.

FIG. 6 is a partial cross-sectional view of the clamping unit.

FIG. 7 is a longitudinal cross-sectional view through another clamping assembly, in particular a clamping unit, in which two insertion rings 70 instead of insertion ring 3 illustrated in FIGS. 1 through 6 are used for loss prevention purposes.

FIG. 8 is a perspective view of adapter shaft 1.

FIG. 9 is an exploded view of the clamping assembly.

FIG. 10 is a perspective view of the clamping assembly before threaded pin 2 is screwed in, adapter shaft 1 and clamping ring 4 being shown in a part-sectional view, and insertion ring 3 being shown in a non-sectioned view.

FIG. 11 is a perspective view of the clamping assembly with threaded pin 2 screwed in, in a part-sectional representation.

FIG. 12 is a plan view of insertion ring 70.

DETAILED DESCRIPTION

Figure 1:
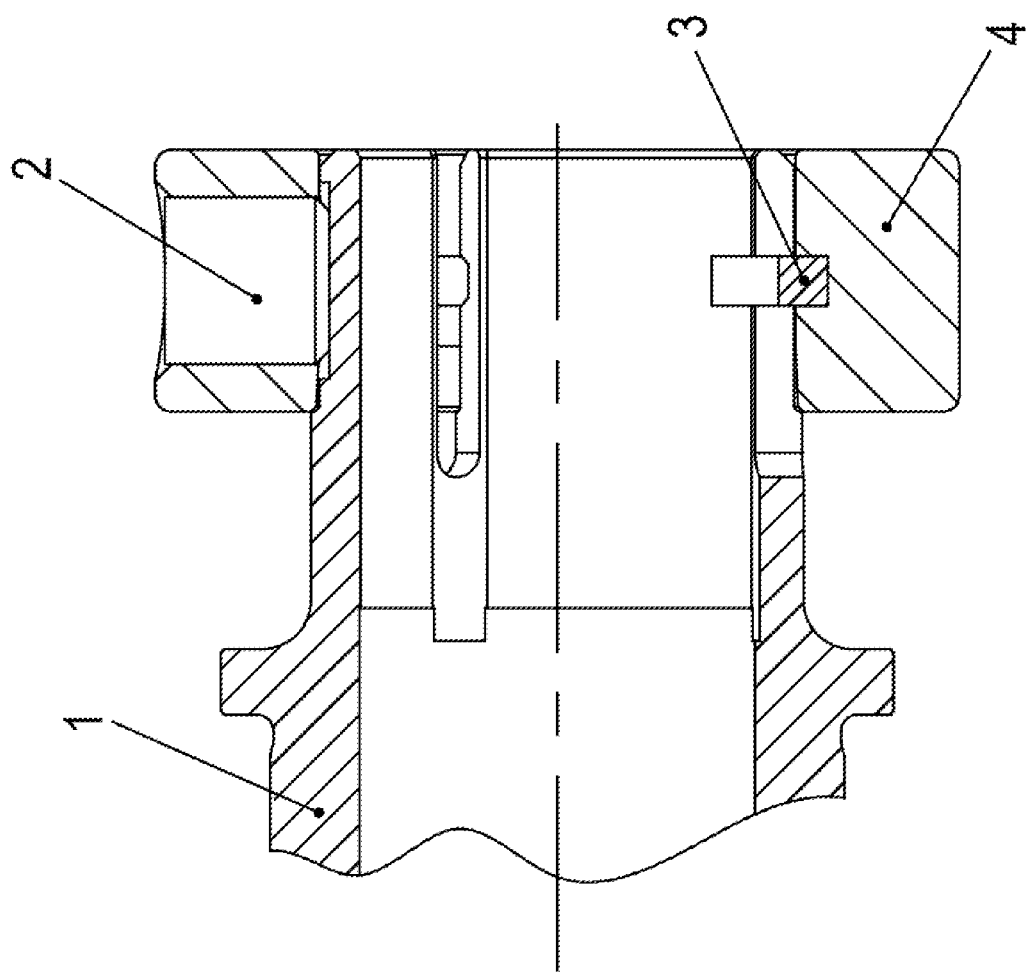
FIGS. 1 through 6 show a first exemplary embodiment.
Figure 2:
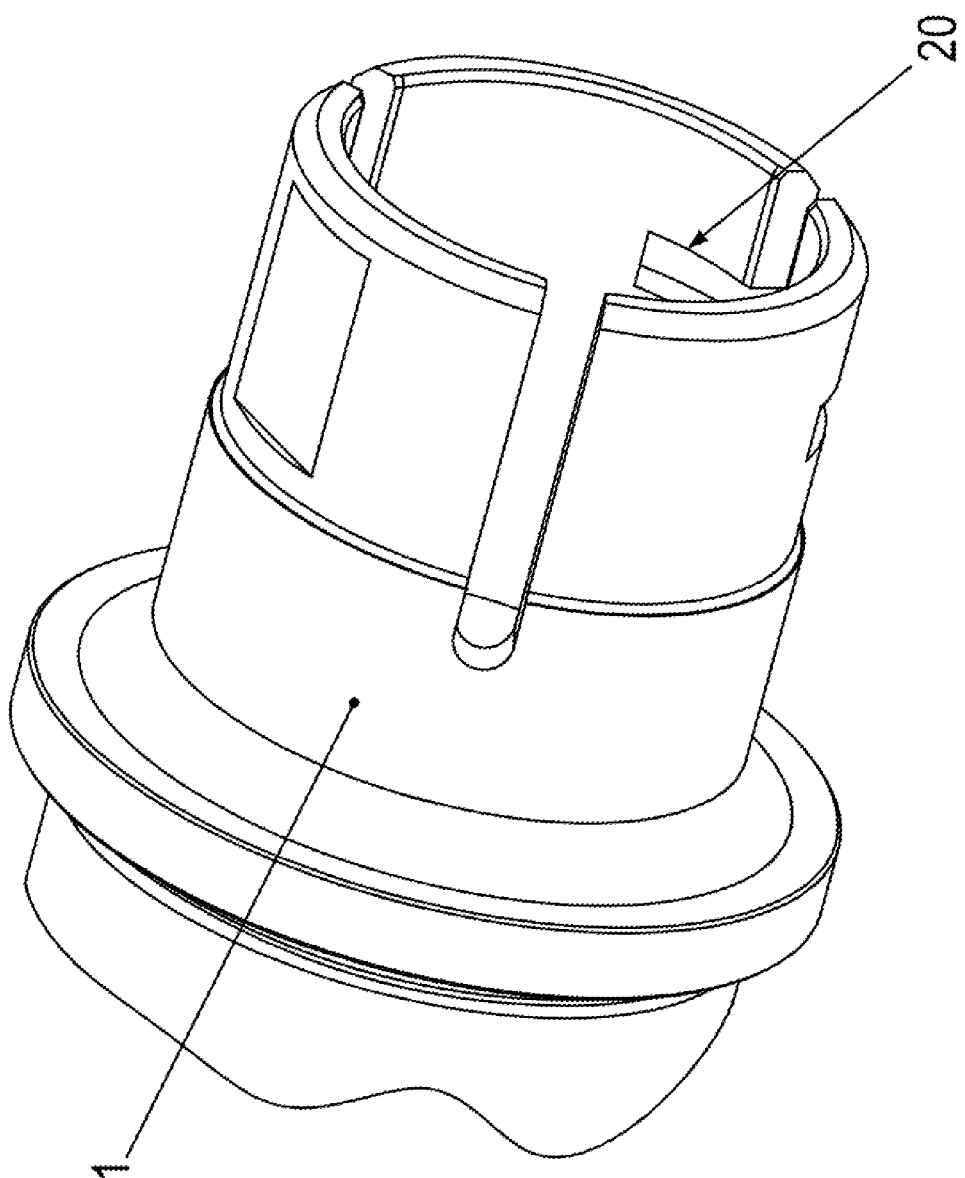
Figure 3:
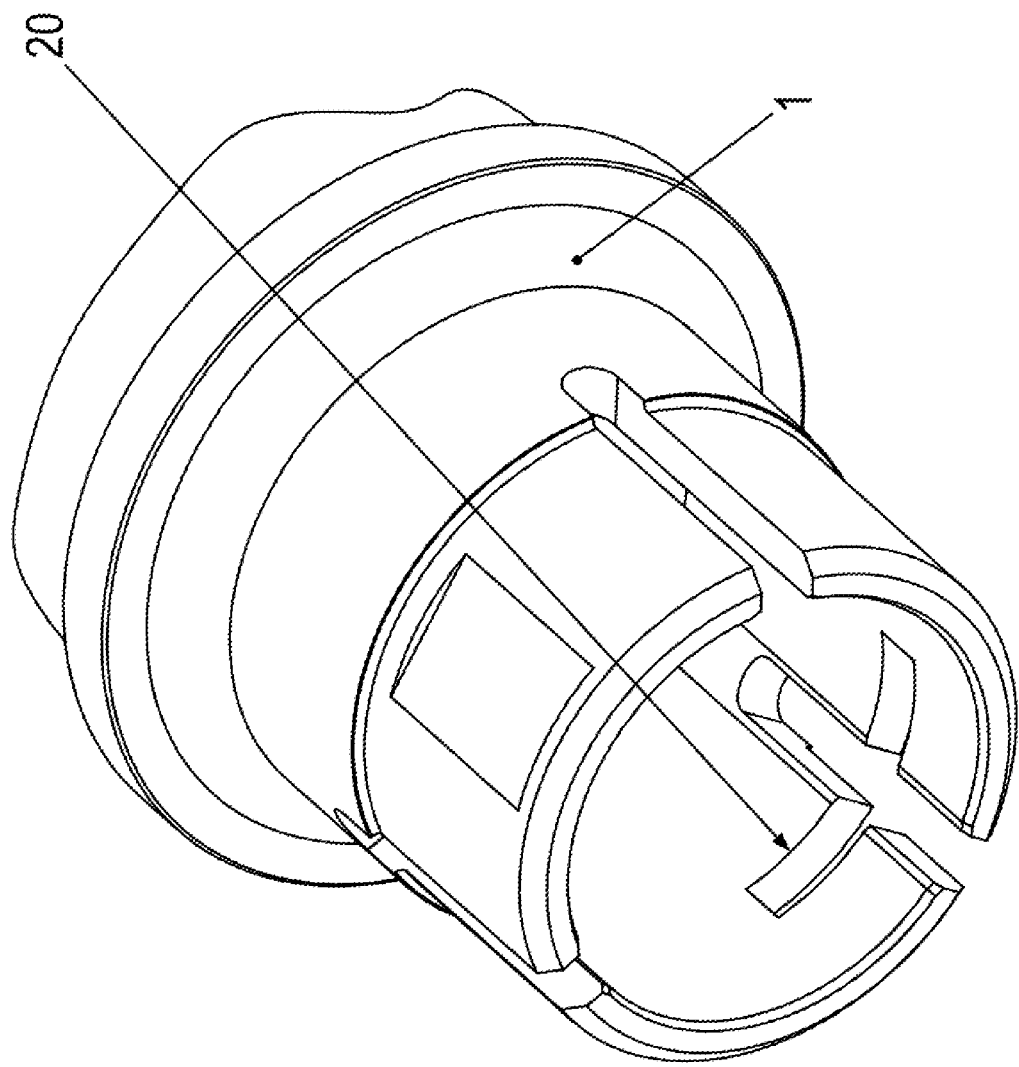
Figure 4:
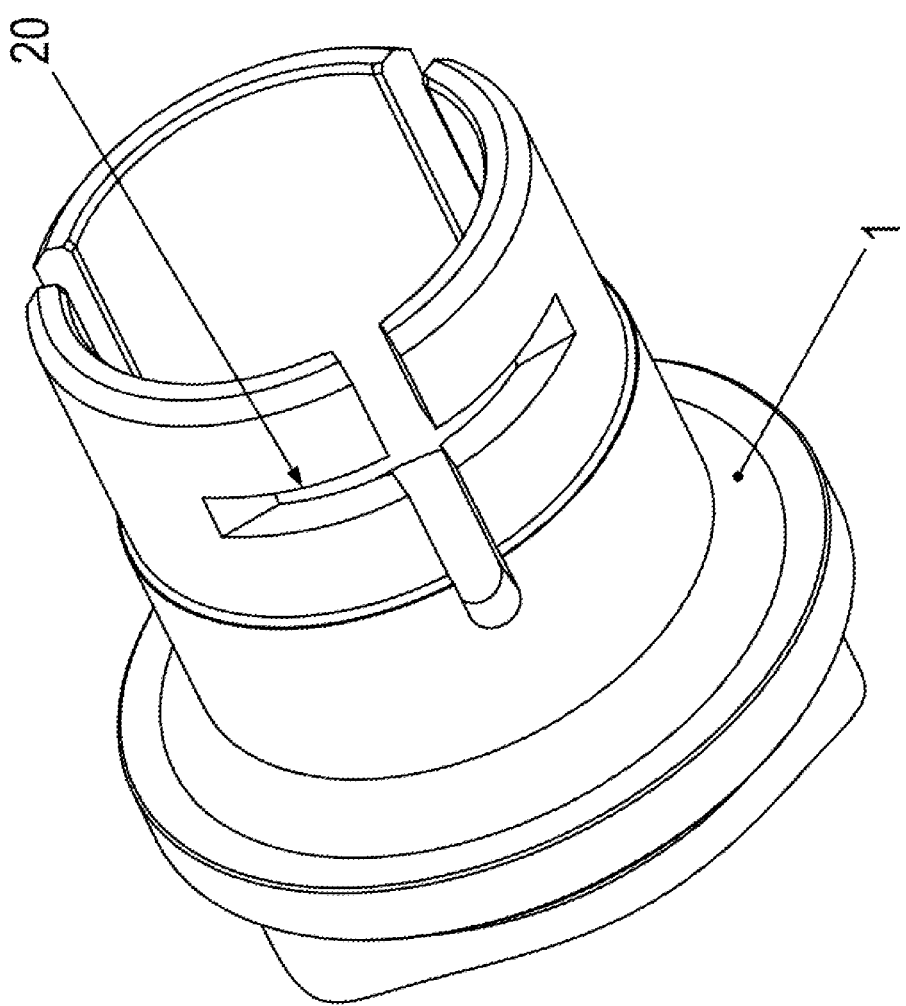
Figure 5:
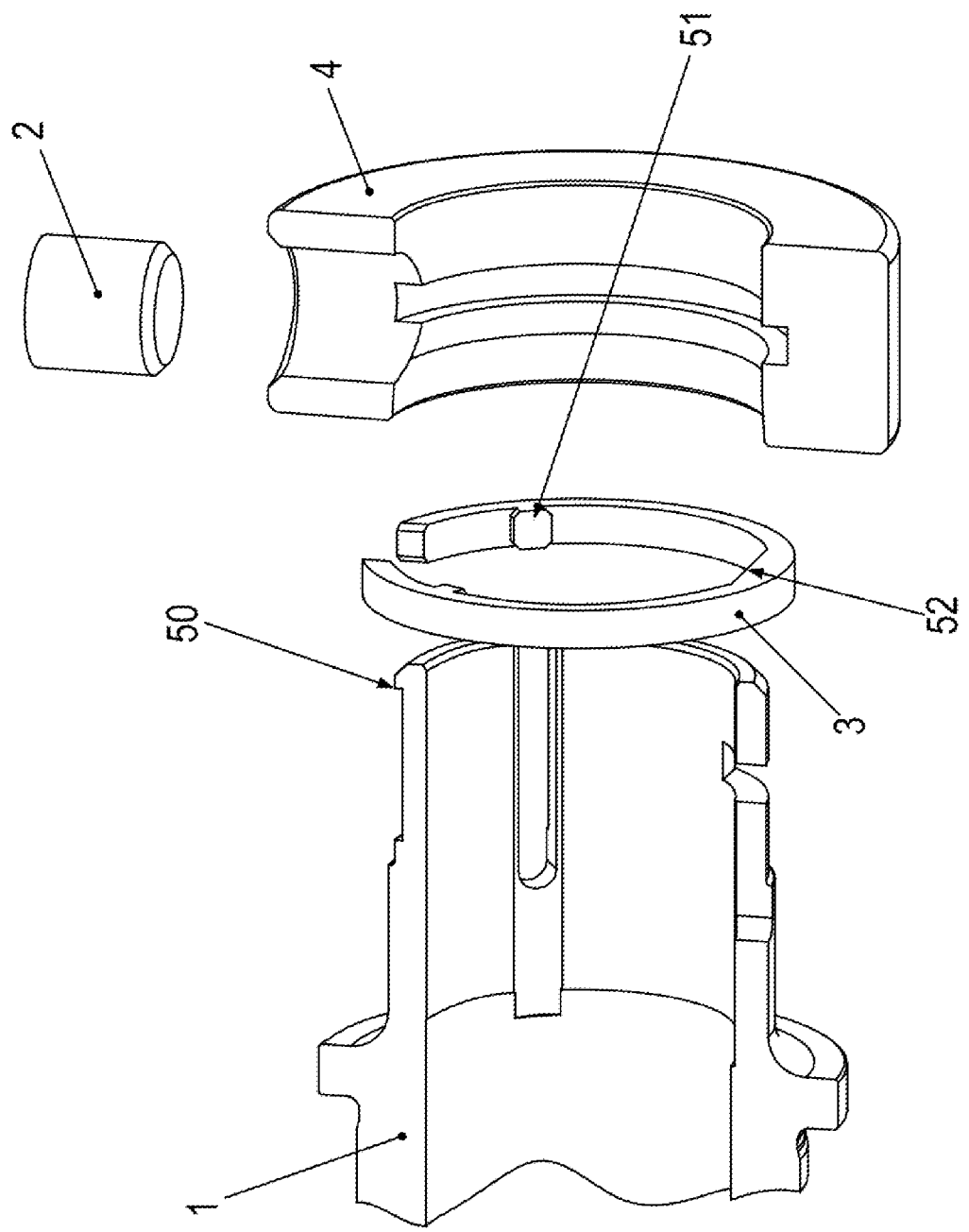
Figure 6:
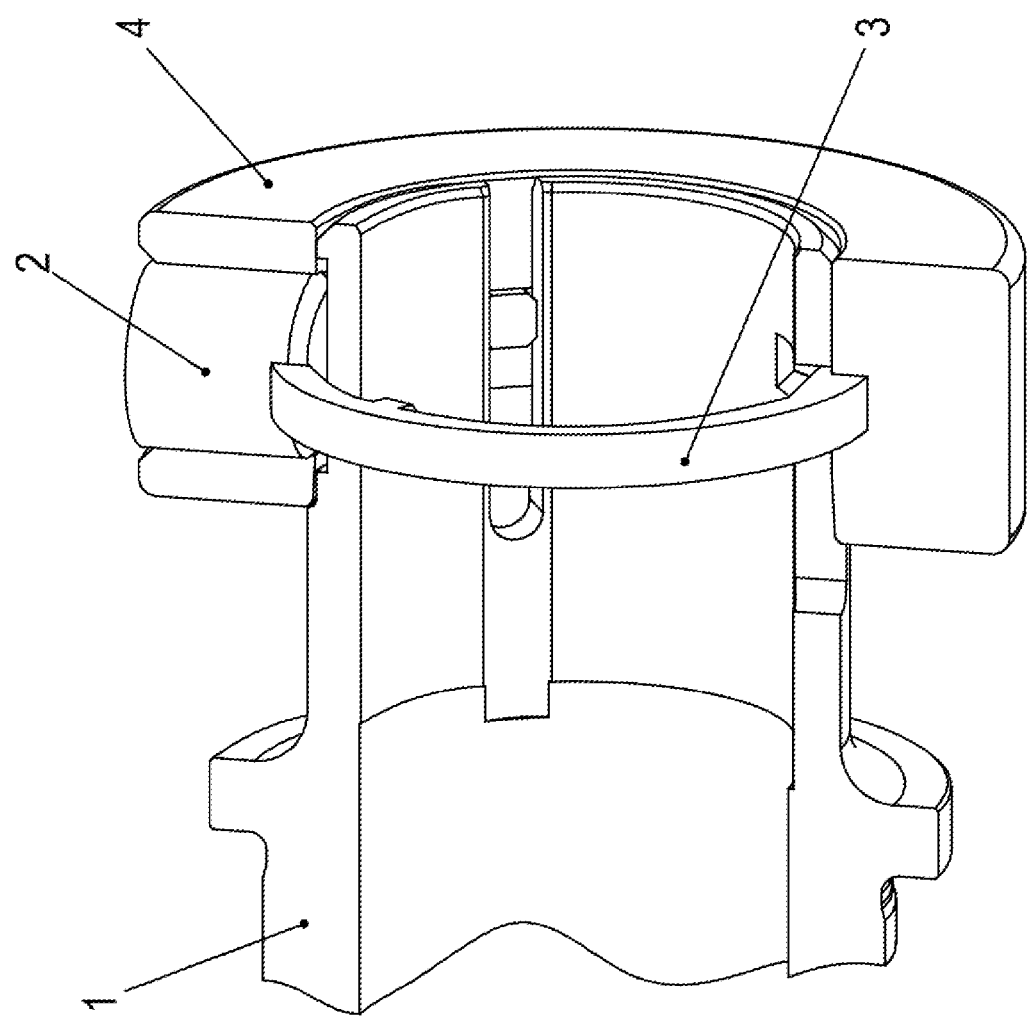
Figure 7:
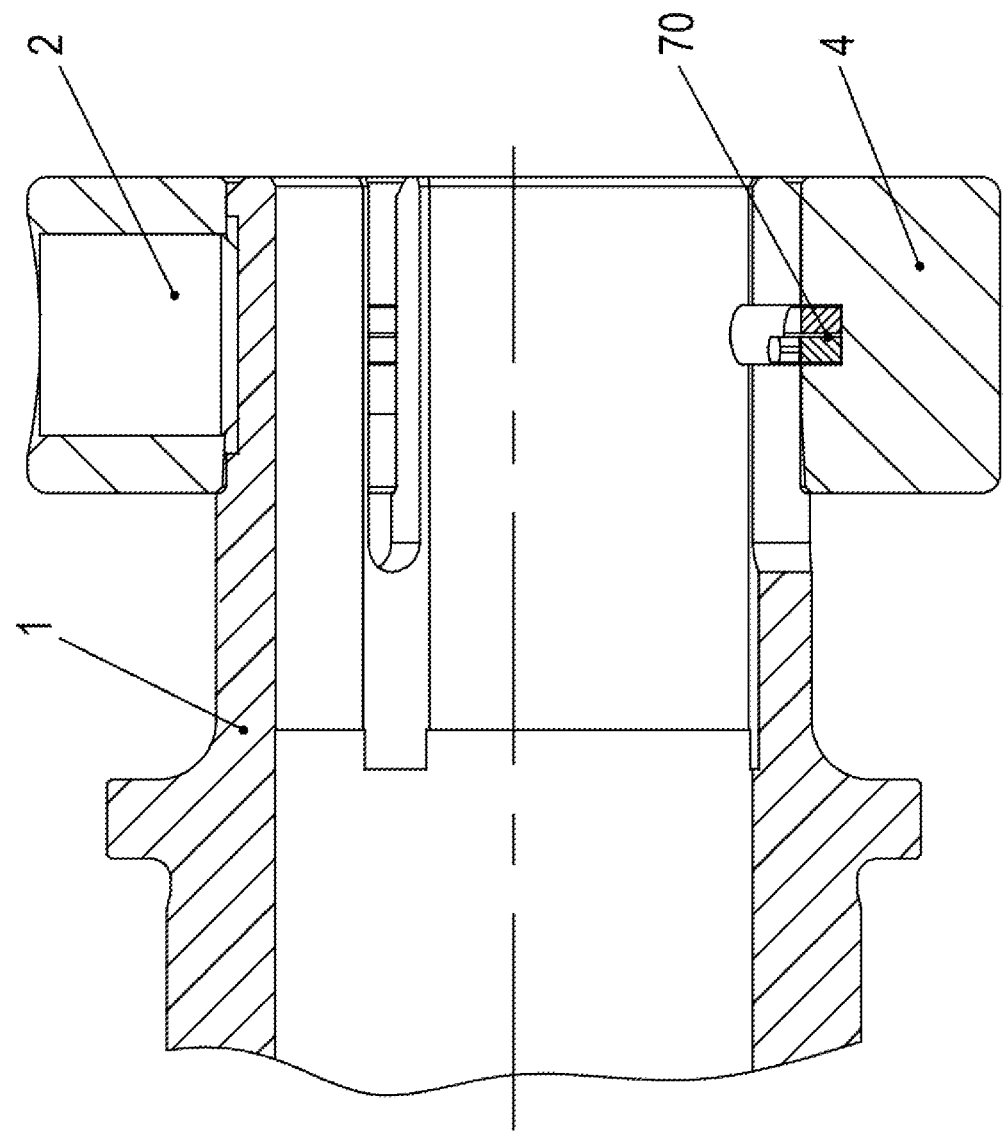
FIGS. 7 through 12 show a second exemplary embodiment.
Figure 8:
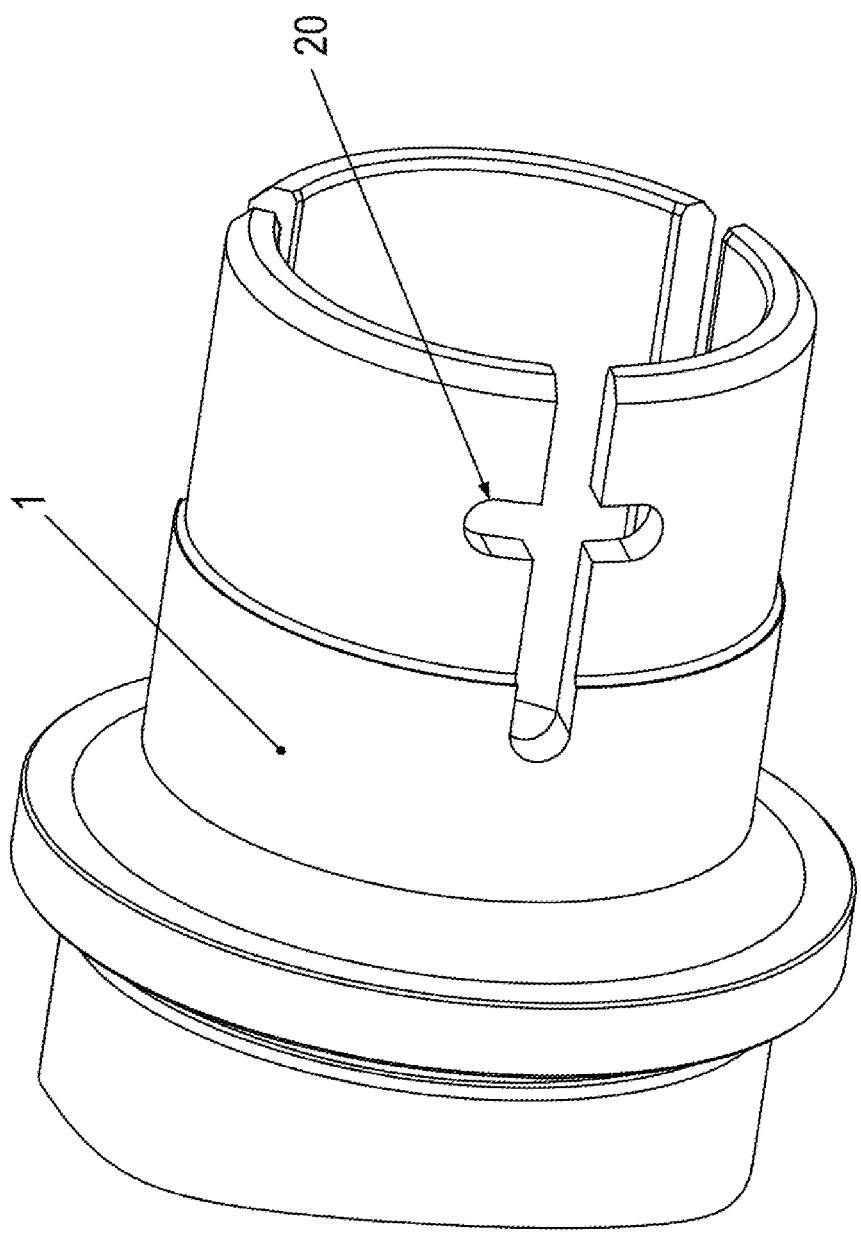

As illustrated in the FIGS. 1 through 6, adapter shaft 1 has a hollow shaft region provided with axially extending slots, i.e. axial slots. The axial slots are, for example, set apart from one another at regular intervals in the circumferential direction and extend from the axially outer first end region of adapter shaft 1 to an axial position that is situated outside the axial region covered by clamping ring 4. The number of slots is, for example, three.

A solid shaft is inserted into adapter shaft 1. As a result, this solid shaft is radially surrounded by adapter shaft 1.

A threaded pin 2 is screwed into a threaded bore that radially extends through clamping ring 4 and exerts pressure on a flattened region 20 provided on adapter shaft 1.

A flattened region is provided on the outer side of adapter shaft 1 and tangentially aligned with respect to the center axis or the axis of rotation of the adapter shaft.

Threaded pin 2 exerts pressure on the flattened region.

In the axial region covered by the flattened region, adapter shaft 1 has a cylindrical configuration at its outer circumference, with the exception of the axial slots and a transverse slot 20.

As a result, adapter shaft 1 is able to be pressed against the solid shaft by screwing threaded pin 2 into the threaded bore that penetrates the clamping ring, which thus particularly means that a shrink-fitting connection is obtained.

Transverse slot 20 is, for example, situated diametrically opposite the flattened region and is used for the engagement of insertion ring 3, which snaps into place in an annular groove circumferentially arranged in the circumferential direction at the inner circumference of clamping ring 4. In the process, a radially inward projecting web region 51 provided on insertion ring 3 engages in transverse slot 20.

This produces a loss protection in the axial direction.

In order to obtain a protection against loss acting in the circumferential direction, nose regions 51 which project radially inward on insertion ring 3 are provided on insertion ring 3.

When the clamping assembly is produced, insertion ring 3 is first inserted into the annular groove provided on the inner wall of clamping ring 4.

Insertion ring 3 is made of an elastic material such as plastic or aluminum. At a circumferential position, insertion ring 3 has an uninterrupted recess and thus is open. The of insertion ring 3 as an open ring produces high elasticity and thus makes for an uncomplicated assembly, in particular a simple insertion into the annular groove.

When insertion ring 3 is placed in the annular groove, the opening of insertion ring 3 is brought into the region of the threaded bore. As a consequence, it is then possible for threaded pin 2 to exert unobstructed pressure on the flattened region of adapter shaft 1 through the opening of the insertion ring once clamping ring 4 has been mounted on adapter shaft 1.

When clamping ring 4 is mounted on adapter shaft 1, nose regions 51 of insertion ring 3 are also used for an alignment because these nose regions 51 engage with the axial slots.

In this manner, adapter shaft 1 is secured in the circumferential direction. This is so because insertion ring 3 is connected in a form-fitting manner to adapter shaft 1 in the circumferential direction with the aid of nose regions 51, in particular by the engagement of nose regions 51 in the axial slots, and on the other side, insertion ring 3 is connected in a form-fitting manner to clamping ring 4 in the circumferential direction with the aid of threaded pin 2 which exerts pressure on the flattened region of adapter shaft 1.

Threaded pin 2 therefore not only has the function of exerting pressure on clamping ring 4 in order to thereby bring about the clamping of the shaft, in particular by shrink-fitting, but also the function of securing the insertion ring in the circumferential direction in a form-fitting manner.

As mentioned above, insertion ring 3 is provided with a web region 50 for the axial securing, which snaps into place in transverse slot 20. Transverse slot 20 is situated perpendicular to one of the axial slots of adapter shaft 1 and extends only across an angular range that is smaller than the angular distance to the next axial slot. However, just like each of the axial slots, transverse slot 20 is arranged to extend radially through adapter shaft 1. Transverse slot 20 extends farther in the circumferential direction than in the axial direction. In contrast, each axial slot extends farther in the axial direction than in the circumferential direction.

Transverse slot 20 passes through the axial slot and is situated at the circumference of the adapter shaft diametrically opposite the flattened region, in particular also like this axial slot.

In the same manner, web region 52 is situated diametrically across from the opening of insertion ring 3.

Insertion ring 3 together with threaded pin 2 thus secures clamping ring 4 in the circumferential direction, and with the aid of its web region 52, which projects into transverse slot 20, insertion ring 3 provides protection in the axial direction.

A lead-in bevel is, for example, provided on adapter shaft 1, which allows for the smooth mounting of adapter shaft 1 on insertion ring 3 accommodated in clamping ring 4. During this mounting of clamping ring 4 on adapter shaft 1, adapter shaft 1 is elastically deformed, in particular radially compressed, and radially shrink-fitted onto the shaft accommodated in adapter shaft 1. Because of the axial slots, this elastic deformation is achievable with little force.

Once the intended position of clamping ring 4 has been reached, adapter shaft 1 relaxes and the shaft may be inserted into adapter shaft 1 with only negligible force. Threaded pin 2 is then screwed in further, i.e. tightened, and thus exerts pressure in the radially inward direction, thereby causing shrink-fitting of adapter shaft 1 onto the shaft. Adapter shaft 1, threaded pin 2 and insertion ring 3 as well as clamping ring 4 thus form a system for a force-fitting connection.

The inner wall of clamping ring 4 is arranged like a region of a rotational solid, i.e. it has a radial distance that is constant in every axial position, i.e. a radial distance that is independent of the circumferential position.

As shown in FIGS. 7 through 12, however, it is also possible to use a pair of insertion rings 70 instead of insertion ring 3.

In contrast to insertion ring 3, these insertion rings 70 have no web region 52 but only nose regions 51.

Figure 9:
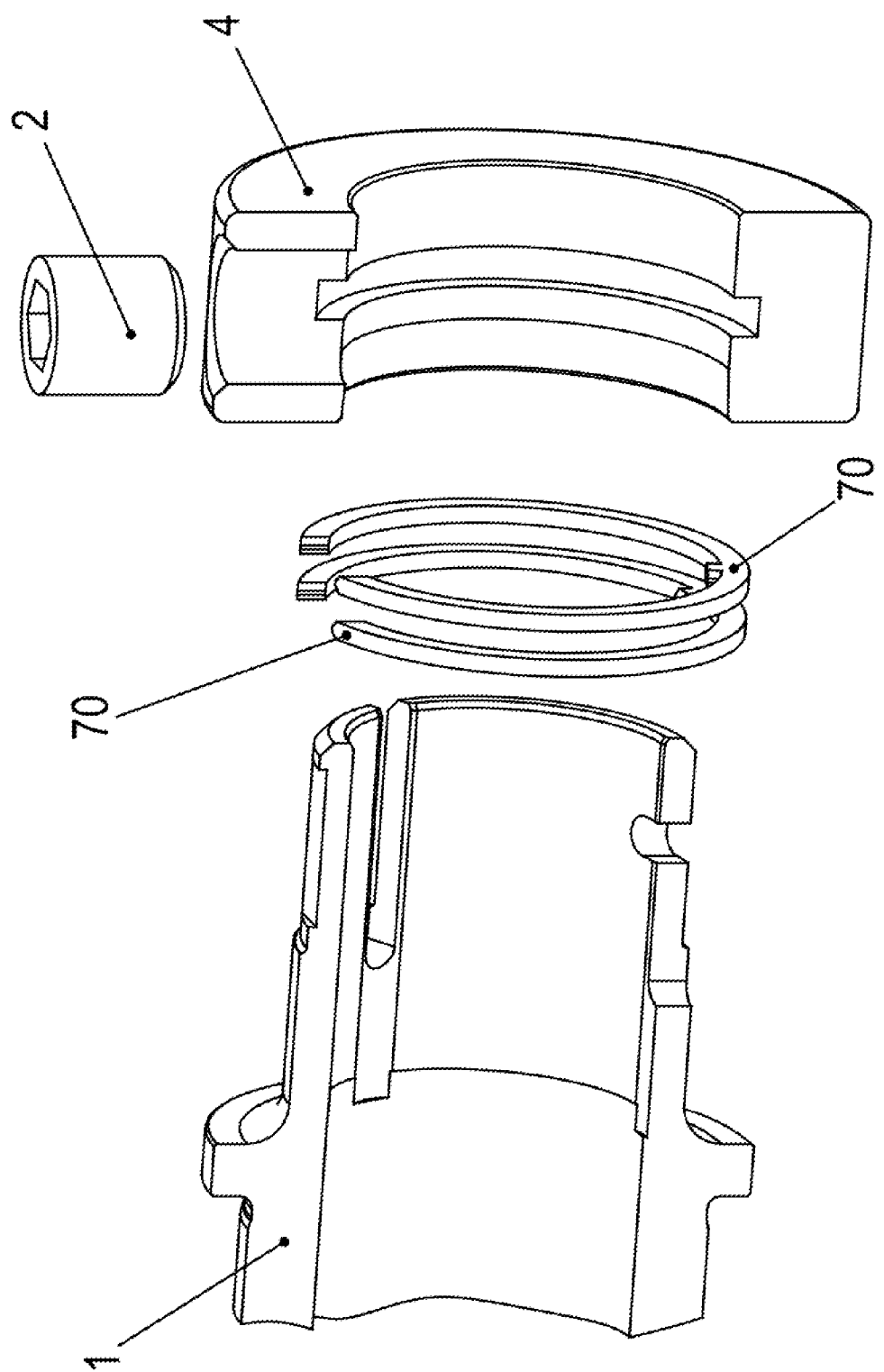
Figure 10:
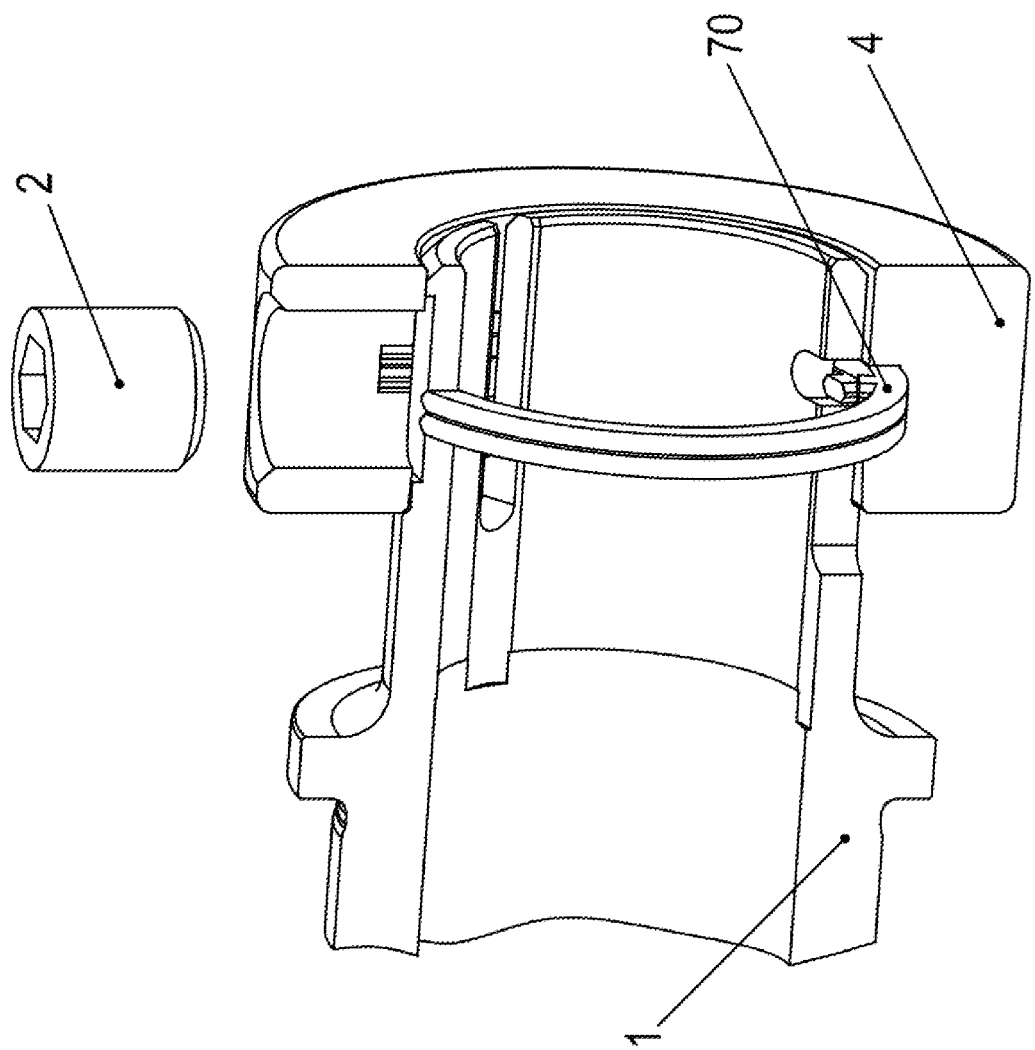
Figure 11:
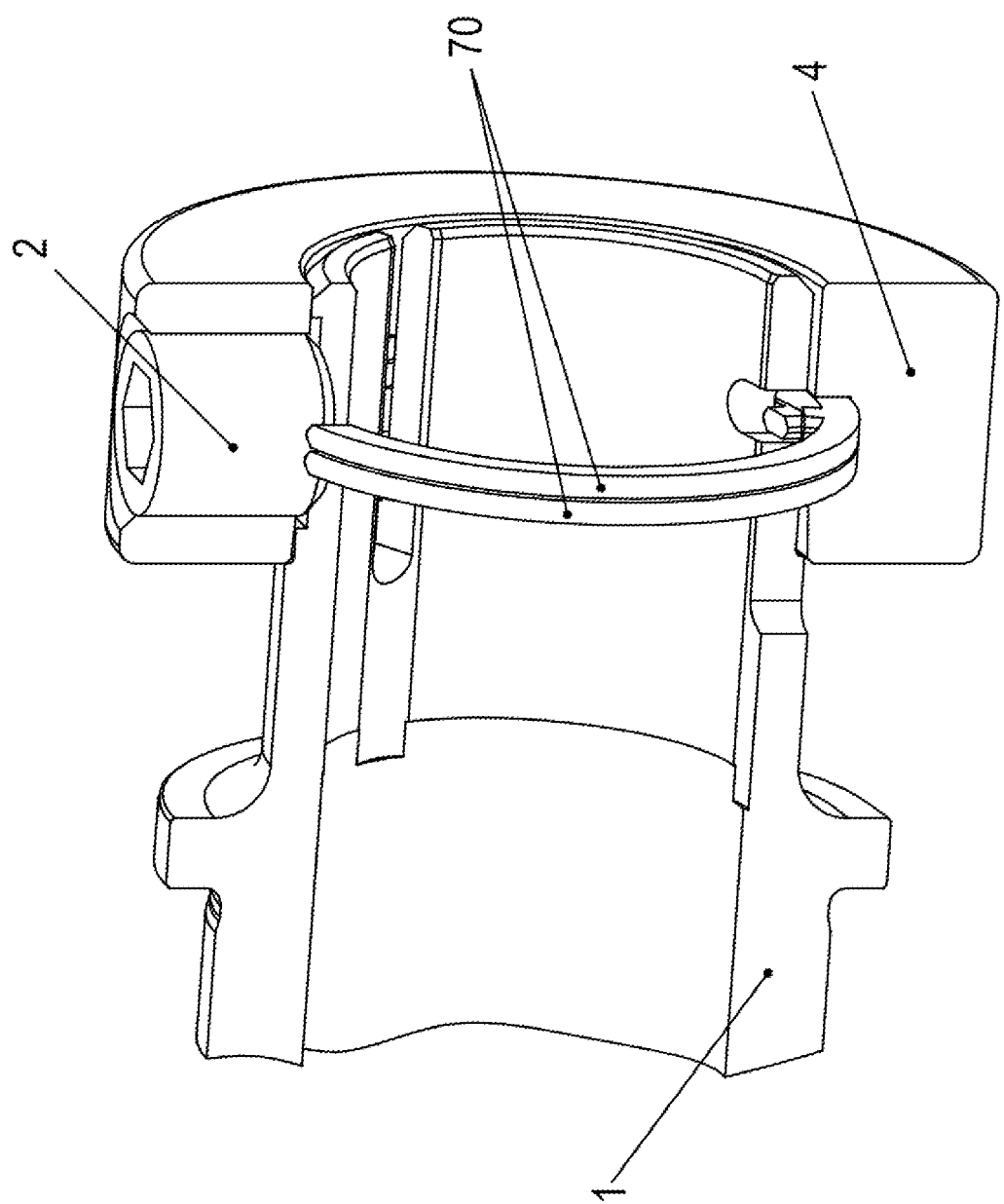
Figure 12:
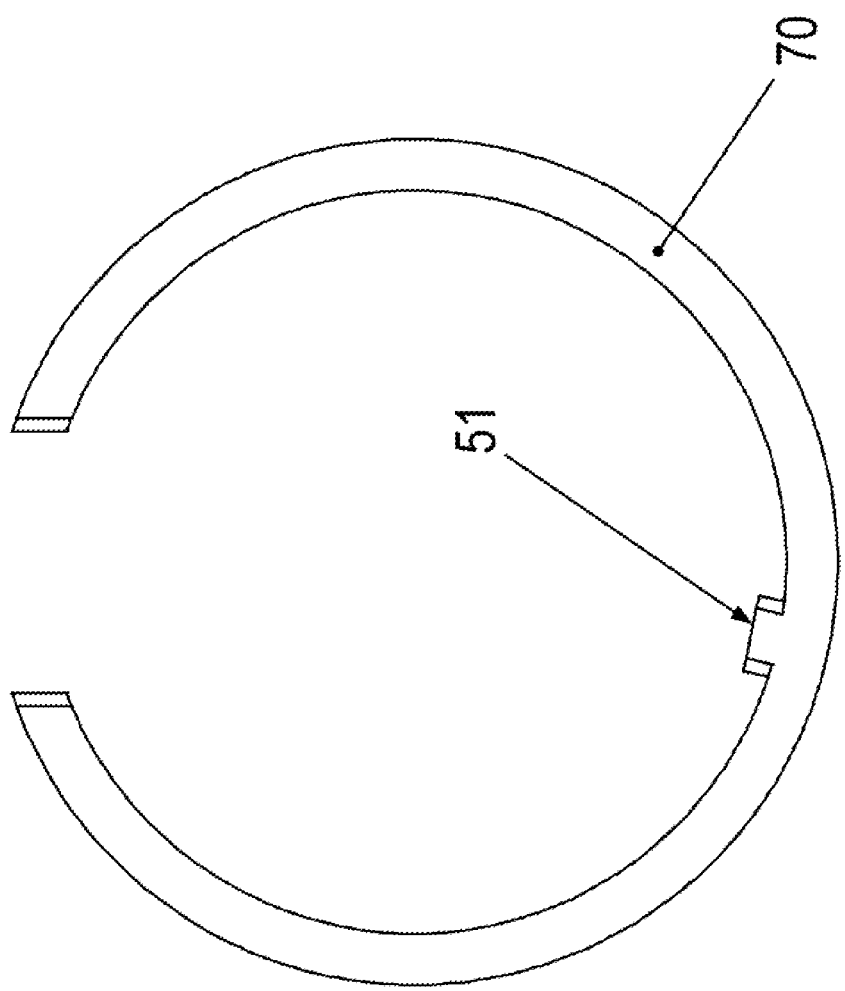

As illustrated in FIG. 12, the respective insertion ring 70 has an open configuration, and the opening is not situated diametrically opposite from radially inward directed nose region 51. As illustrated in FIGS. 9, 10 and 11, the two insertion rings 70 are accommodated in the annular groove of clamping ring 4, and the openings are aligned such that threaded pin 2 exerts pressure through the openings directly on the flattened region of adapter shaft 1.

The two insertion rings 70 may have the same type of configuration but they are situated at a 180° rotation from each other. As a result, insertion rings 70 may rest against each other but nose regions 51 are situated at different circumferential positions.

The pair of insertion rings 70 is introduced into the annular groove provided on clamping ring 4. As a result, nose regions 51 project radially inward. When clamping ring 4 is mounted on adapter shaft 1, insertion rings 70 are oriented such in the annular groove, i.e. provided in such a rotary position in the circumferential direction, that nose regions 51 are able to be inserted into one of the axial slots of adapter shaft 1. After the mounting has been completed, insertion rings 70 are rotated relative to each other such that nose regions 51 are shifted in transverse slot 20 and are positioned on two different sides in relation to the axial slot. In this manner, axial securing is then brought about with the aid of nose regions 51 situated in the transverse slot. In addition, the rotary position of insertion rings 70 is such that the openings have the same area in the circumferential direction or at least overlap so that threaded pin 2 is able to exert pressure directly on the flattened region of adapter shaft 1.

In this manner, securing is also achieved in the circumferential direction.

A radially outward projecting bead 50 is formed on the adapter shaft 1 in the axial end region. Threaded pin 2 presses on a flattened region provided on the adapter shaft, which covers a circumferential angular range in the circumferential direction that is similar to the circumferential angular region covered by bead 50 in the circumferential direction. The radial elevation is related to the flattened region.

In another exemplary embodiment, clamping ring 4 has in its end region, which faces adapter shaft 1 at the start of the mounting, a chamfer for an uncomplicated realization of the elastic shrinking, i.e. the elastic deflection of the slotted axial region of adapter shaft 1, the chamfer acting as a lead-in bevel and thus causing an increasing elastic deflection of the slotted region during the insertion process, i.e. the mounting of clamping ring 4 on adapter shaft 1.

The arrangement hereof thus allows for a clamping connection, in particular a shrink-disk connection, between an adapter shaft and a shaft, in particular a solid shaft, including an integrated protection against loss.

In a further exemplary embodiment, insertion ring 3 is also able to be made of steel.

LIST OF REFERENCE NUMERALS 1 adapter shaft, in particular hollow shaft region
2 threaded pin
3 insertion ring
4 clamping ring
20 transverse slot
50 bead
51 nose region
52 web region
70 insertion ring

The invention claimed is:

1. An assembly for connecting an adapter shaft to a shaft in a force-fitting manner, the adapter shaft including an outer circumference and a flattened region arranged on the outer circumference of the adapter shaft, comprising:
a clamping ring adapted to be mounted on the adapter shaft, the shaft insertable into the adapter shaft, the clamping ring including a radially uninterrupted threaded bore and an annular groove;
a screw part screwed into the radially uninterrupted threaded bore and adapted to exert pressure on the flattened region of the adapter shaft;
at least one insertion ring at least partially arranged in the annular groove and including a nose region that projects radially inward and is adapted to project at least partially into a slot of the adapter shaft.

2. The assembly according to claim 1, wherein the screw part includes a threaded pin.

3. The assembly according to claim 1, wherein the annular groove is provided in an inner wall and/or a hollow side of the clamping ring.

4. The assembly according to claim 1, wherein the slot is axially continuous and/or continues through a wall of the adapter shaft, the adapter shaft being hollow; and
wherein the slot is arranged as an axial slot extending in an axial direction in relation to a shaft axis of the adapter shaft and/or the slot is arranged as a transverse slot extending transversely to the axial direction in relation to the shaft axis of the adapter shaft and/or in a circumferential direction in relation to the shaft axis of the adapter shaft.

5. The assembly according to claim 4, wherein the transverse slot passes through an axial slot.

6. The assembly according to claim 4, wherein the adapter shaft includes additional axial slots, and the axial slots of the adapter shaft are set apart from one another at regular intervals in the circumferential direction.

7. The assembly according to claim 4, wherein axial slots are open toward an axial end of the adapter shaft and lead into the environment and/or into the ambient air.

8. The assembly according to claim 4, wherein the insertion ring includes a radially inwardly projecting web region that is set apart from the nose region in the circumferential direction, the web region at least partially projecting into the transverse slot.

9. The assembly according to claim 8, wherein the web region projects radially inward and includes a radially inward edge that is aligned tangentially.

10. The assembly according to claim 1, wherein the insertion ring is arranged as a plastic injection molding part.

11. The assembly according to claim 1, wherein the shaft is insertable into a hollow shaft region of the adapter shaft and/or is coaxially arranged coaxially with the adapter shaft.

12. The assembly according to claim 1, wherein the adapter shaft includes a chamfer and/or a lead-in bevel in an axial end region.

13. The assembly according to claim 1, wherein the clamping ring includes a lead-in bevel in an axial end region.

14. The assembly according to claim 1, wherein the adapter shaft includes, in an axial end region, a bead that is raised in a radially outward direction and that covers a circumferential angular range in a circumferential direction, which includes a circumferential angular range covered by the screw part in the circumferential direction and/or which is similar to a circumferential angular range covered by the flattened region in the circumferential direction.

15. The assembly according to claim 1, wherein the flattened region is arranged diametrically opposite the slot.

16. The assembly according to claim 1, wherein the slot is arranged as an axial slot extending in an axial direction in relation to a shaft axis of the adapter shaft, and the slot is arranged as a transverse slot extending transversely to the axial direction in relation to the shaft axis of the adapter shaft and/or in a circumferential direction in relation to the shaft axis of the adapter shaft.

17. A device, comprising:
an adapter shaft including a slot, an outer circumference, and a flattened region arranged on the outer circumference;
a shaft inserted into the adapter shaft;
an assembly connecting the adapter shaft to the shaft in a force-fitting manner, the assembly including:
a clamping ring mounted on the adapter shaft and including a radially uninterrupted threaded bore and an annular groove;
a screw part screwed into the radially uninterrupted threaded bore and exerting pressure on the flattened region of the adapter shaft; and
at least one insertion ring at least partially arranged in the annular groove and including a nose region that projects radially inward and projects at least partially into the slot of the adapter shaft.

18. The device according to claim 17, wherein the flattened region is arranged diametrically opposite the slot.

19. The device according to claim 17, wherein the slot is arranged as an axial slot extending in an axial direction in relation to a shaft axis of the adapter shaft, and the slot is arranged as a transverse slot extending transversely to the axial direction in relation to the shaft axis of the adapter shaft and/or in a circumferential direction in relation to the shaft axis of the adapter shaft.

* * * * *